United States Patent
Yamagiwa et al.

(10) Patent No.: US 6,696,936 B2
(45) Date of Patent: Feb. 24, 2004

(54) AIR PRESSURE DETECTING DEVICE FOR WHEEL

(75) Inventors: Toshio Yamagiwa, Saitama (JP); Tomoyuki Harada, Saitama (JP); Osamu Bunya, Saitama (JP); Takashi Ashigai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/988,763

(22) Filed: Nov. 20, 2001

(65) Prior Publication Data

US 2002/0126006 A1 Sep. 12, 2002

(30) Foreign Application Priority Data

Nov. 20, 2000 (JP) ........................................ 2000-353006
Jan. 24, 2001 (JP) ........................................ 2001-016383

(51) Int. Cl.[7] ............................................. B60C 23/00
(52) U.S. Cl. ...................... 340/447; 340/442; 340/445; 340/448
(58) Field of Search ................................ 340/442–448; 200/61.25, 61.22, 693.6, 693.9, 693.12, 693.5; 137/227

(56) References Cited

U.S. PATENT DOCUMENTS

| | | | | |
|---|---|---|---|---|
| 3,638,180 A | * | 1/1972 | Lejeune | 340/445 |
| 3,828,309 A | * | 8/1974 | Yamasaki et al. | 340/448 |
| 3,859,628 A | * | 1/1975 | Favini | 340/445 |
| 3,985,984 A | * | 10/1976 | Cappa | 200/61.22 |
| 4,701,742 A | * | 10/1987 | Ruehr | 200/61.25 |
| 4,851,809 A | * | 7/1989 | McAlister | 340/442 |
| 5,040,561 A | * | 8/1991 | Achterholt | 137/227 |
| 5,119,066 A | * | 6/1992 | Ballyns | 340/442 |
| 6,011,462 A | * | 1/2000 | Cooper | 340/442 |
| 6,100,798 A | * | 8/2000 | Liang | 340/447 |
| 6,160,474 A | * | 12/2000 | Tsunetomi et al. | 340/442 |
| 6,252,498 B1 | * | 6/2001 | Pashayan, Jr. | 340/447 |

FOREIGN PATENT DOCUMENTS

JP          10-44726          2/1998

* cited by examiner

Primary Examiner—Benjamin C. Lee
(74) Attorney, Agent, or Firm—Birch, Stewart, Kolasch & Birch, LLP

(57) ABSTRACT

An air pressure detecting device for detecting the air pressure of a wheel of a vehicle which has a tire tube disposed in a tire. The air pressure detecting device is disposed between the tire tube and the rim of the wheel portion for detecting the air pressure of the tire. The air pressure detecting device includes an annular seat mounted in an opening defined in the tire tube. A lid member is removably fitted over the seat. A detecting and transmitting unit is integrally mounted in the lid member for detecting an air pressure in the tire tube and transmitting pressure information out of the detecting and transmitting unit. When the tire is to be replaced, the lid member is removed, and the detecting and transmitting unit is attached to a new tire for use.

16 Claims, 8 Drawing Sheets

AIR PRESSURE DETECTING DEVICE FOR WHEEL

CROSS-REFERENCE TO RELATED APPLICATIONS

The present application claims priority under 35 USC 119 to Japanese Patent Application No. 2000-353006 filed on Nov. 20, 2000 and Japanese Patent Application No. 2001-016383 filed on Jan. 24, 2001 the entire contents thereof are hereby incorporated by reference.

BACKGROUND OF THE INVENTION

1. Field of the Invention

The present invention relates to an air pressure detecting device for a wheel for detecting the air pressure of a tire to allow the driver to recognize the air pressure of the tire even while the vehicle is being operated.

2. Description of Background Art

One air pressure detecting device for a wheel for allowing the driver to recognize the air pressure of a tire even while the vehicle is being operated is disclosed in Japanese Patent Laid-open No. Hei 10-44726 entitled "Tire Air Pressure Warning Device."

According to FIG. 1 of Japanese Patent Laid-open No. Hei 10-44726, the disclosed arrangement is a tire air pressure warning device that includes a valve stem 10 (the reference numeral is from the publication) mounted on a wheel rim 1. A case 2 is disposed beneath the valve stem 10 and a transmitter 7 is housed in the case 2. A pressure detector 3 is provided together with a signal processing circuit 4 and a cell 5.

While the above tire air pressure warning device is of a structure that can be mounted on a tubeless tire, it is not suitable for use on a tire with a tube.

In order to use the tire air pressure warning device on a tire with a tube, it is necessary to attach the transmitter 7 to the tire tube. However, the transmitter 7 cannot directly be attached to the tire tube.

SUMMARY OF THE INVENTION

It is therefore an object of the present invention to provide an air pressure detecting device for a wheel which can be mounted on a tire with a tube.

To achieve the above object, an air pressure detecting device according to the present invention is provided for detecting the air pressure of a wheel of a vehicle which has a tire tube disposed in a tire. The air pressure detecting device is disposed between the tire tube and the rim of the wheel for detecting the air pressure of the tire wherein the air pressure detecting device includes an annular seat mounted in an opening defined in the tire tube, a lid member held in removably fitting engagement with the seat, and a detecting and transmitting unit integrally mounted in the lid member for detecting an air pressure in the tire tube and transmitting pressure information out of the detecting and transmitting unit.

The air pressure of the tire which is detected is effective based on driving information for detecting the air pressure while the vehicle is being operated. The annular seat is mounted in the opening defined in the tire tube, the lid member is removably fitted over the seat, and the detecting and transmitting unit is integrally mounted in the lid member for detecting an air pressure in the tire tube and transmitting pressure information out of the detecting and transmitting unit for the driver to know the air pressure of the tire while the vehicle is being operated.

The detecting and transmitting unit is integrally mounted in the lid member, and the lid member is held in removably fitting engagement with the seat. When the tire is to be replaced, the lid member is removed, and the detecting and transmitting unit is attached to a new tire for use.

Thus, the detecting and transmitting unit can be reinstalled for reuse. As a result, the air pressure detecting device can effectively be used for material saving.

According to the present invention, the air pressure detecting device is characterized in that an air valve is integrally mounted on the lid member for introducing air into the tire tube.

With the air valve integrally mounted on the lid member, the number of parts of the wheel is reduced. As a result, the costs of the wheel and the air pressure detecting device are lowered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
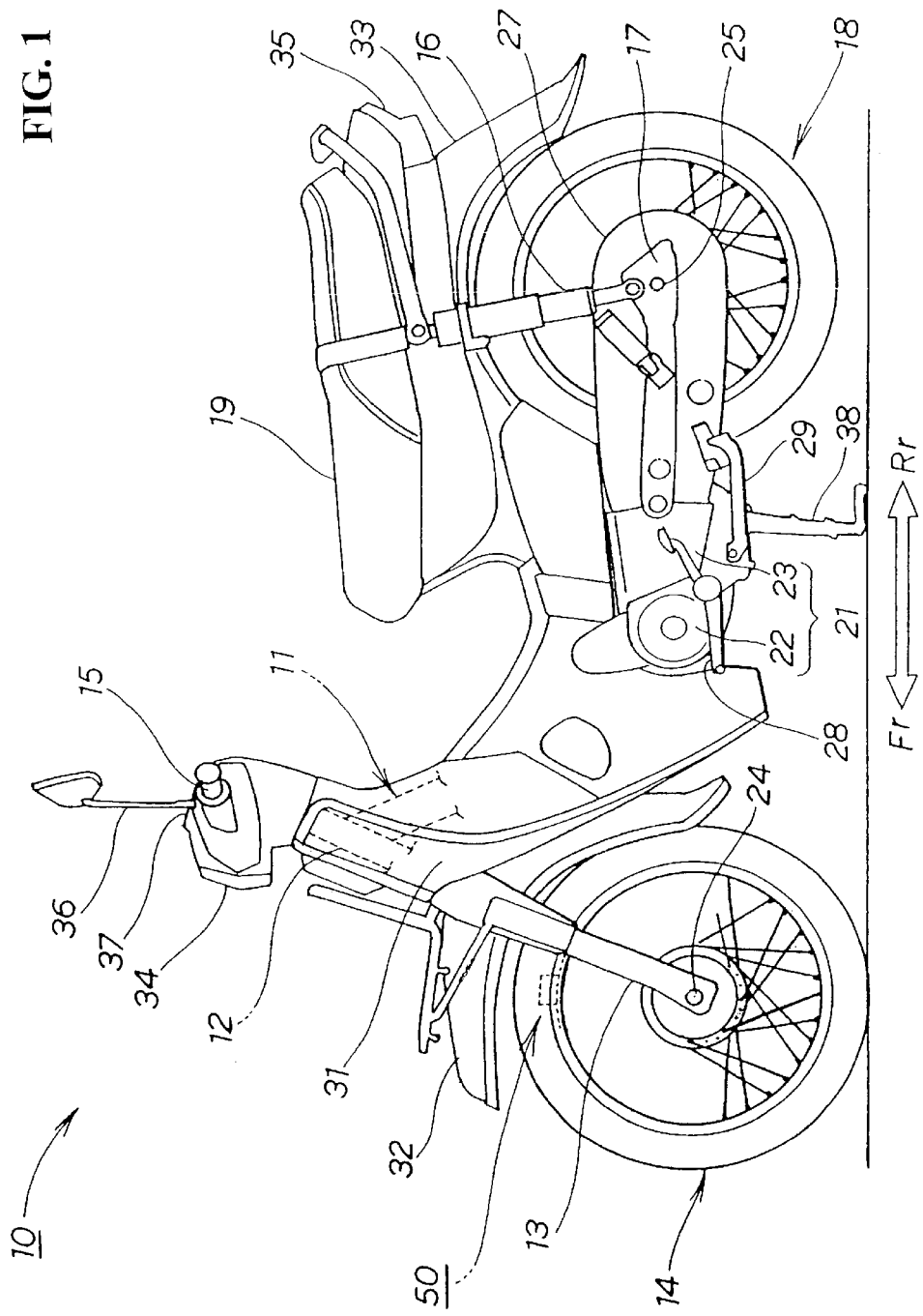
FIG. 1 is a side elevational view of a motorcycle which incorporates an air pressure detecting device for a wheel according to the present invention.

Embodiments of the present invention will be described below with reference to the accompanying drawings. The terms "front," "rear," "left," "right," "upper," and "lower" are used to refer to the directions as viewed from the driver, and "Fr" represents front, "Rr" represents rear, "L" represents left, and "R" represents right. The figures should be viewed in the direction in which the reference characters.

FIG. 1 is a side elevational view of a motorcycle which incorporates an air pressure detecting device for a wheel according to the present invention. The motorcycle 10 is an engine-operated motorcycle having, as major components, a chassis frame 11 extending rearwardly and downwardly of the vehicle. A head pipe 12 is mounted on the chassis frame 11. A front fork 13 is mounted on the head pipe 12. A front wheel 14 is mounted on the front fork 13 with a handle 15 connected to the front fork 13. A rear suspension 16 includes an end attached to a rear upper portion of the chassis frame 11. A swing arm 17 is swingably connected between the other end of the rear suspension 16 and a rear lower portion of the chassis frame 11. A rear wheel 18 is mounted on the distal end of the swing arm 17. A seat 19 is mounted on the rear upper portion of the chassis frame 11 and a power unit 21 is disposed beneath the chassis frame 11 and includes an engine 22 and a transmission 23.

In FIG. 1, the motorcycle also includes axles 24, 25, a drive chain cover 27, a brake pedal 28, a kick pedal 29, a leg shield 31, a front fender 32, a rear fender 33, a head lamp 34, a tail lamp 35, a rear-view mirror 36, an instrumental panel 37, and a stand 38.

An air pressure detecting device 50 for a wheel serves to detect the air pressure of a tire and allows the driver to recognize the air pressure of the tire even while the vehicle is being operated.

Figure 2:
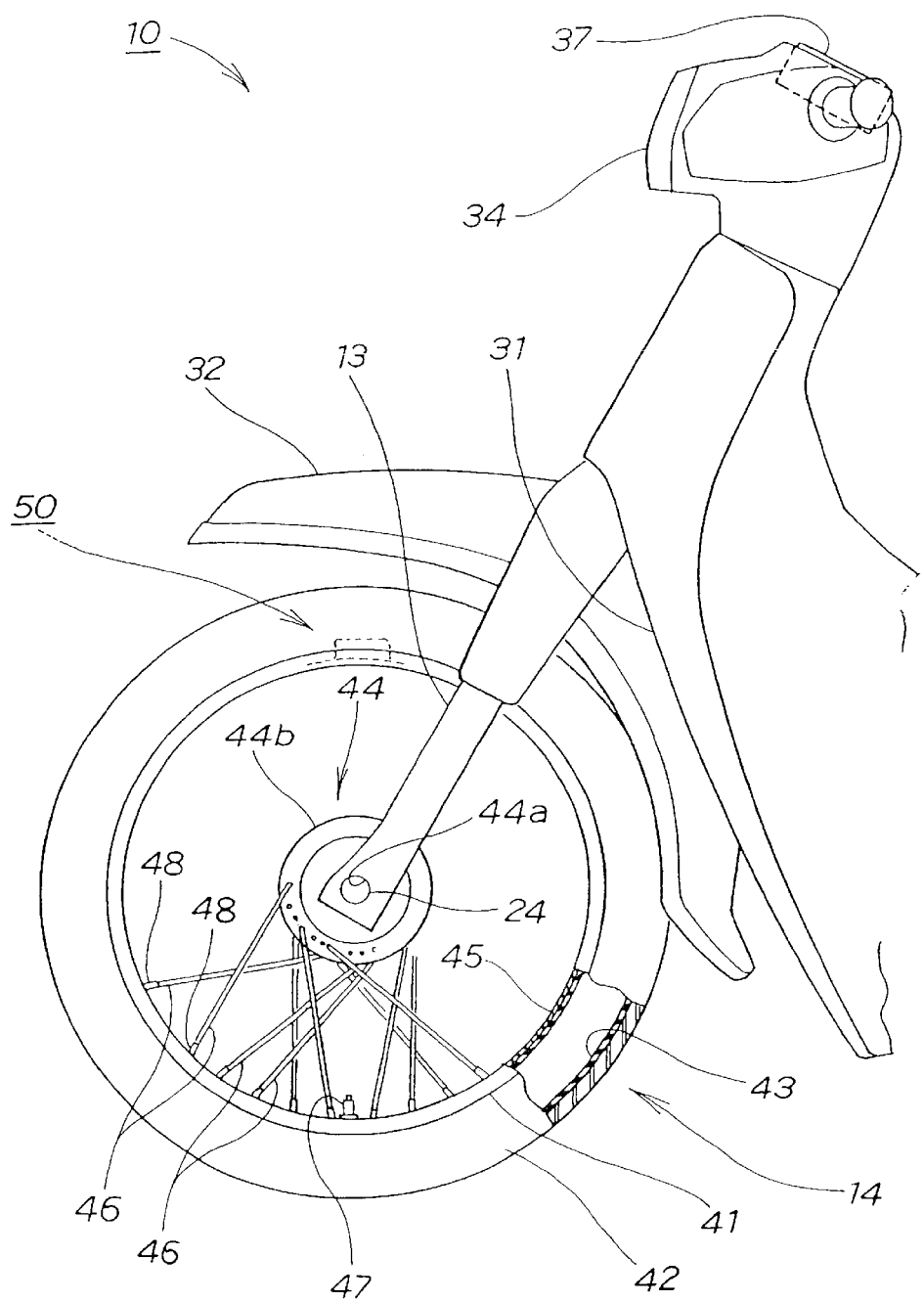
FIG. 2 is a side elevational view of a front portion of the motorcycle which incorporates the air pressure detecting device for a wheel according to the present invention.

FIG. 2 is a side elevational view of a front portion of the motorcycle which incorporates the air pressure detecting device for a wheel according to the present invention.

The wheel 14 comprises a disk-shaped wheel portion 41, a tire 42 mounted on the wheel portion 41, and a tire tube 43 accommodated between the wheel portion 41 and the tire 42. The air pressure detecting device 50 is interposed between the tire tube 43 and the wheel portion 41.

Figure 3:
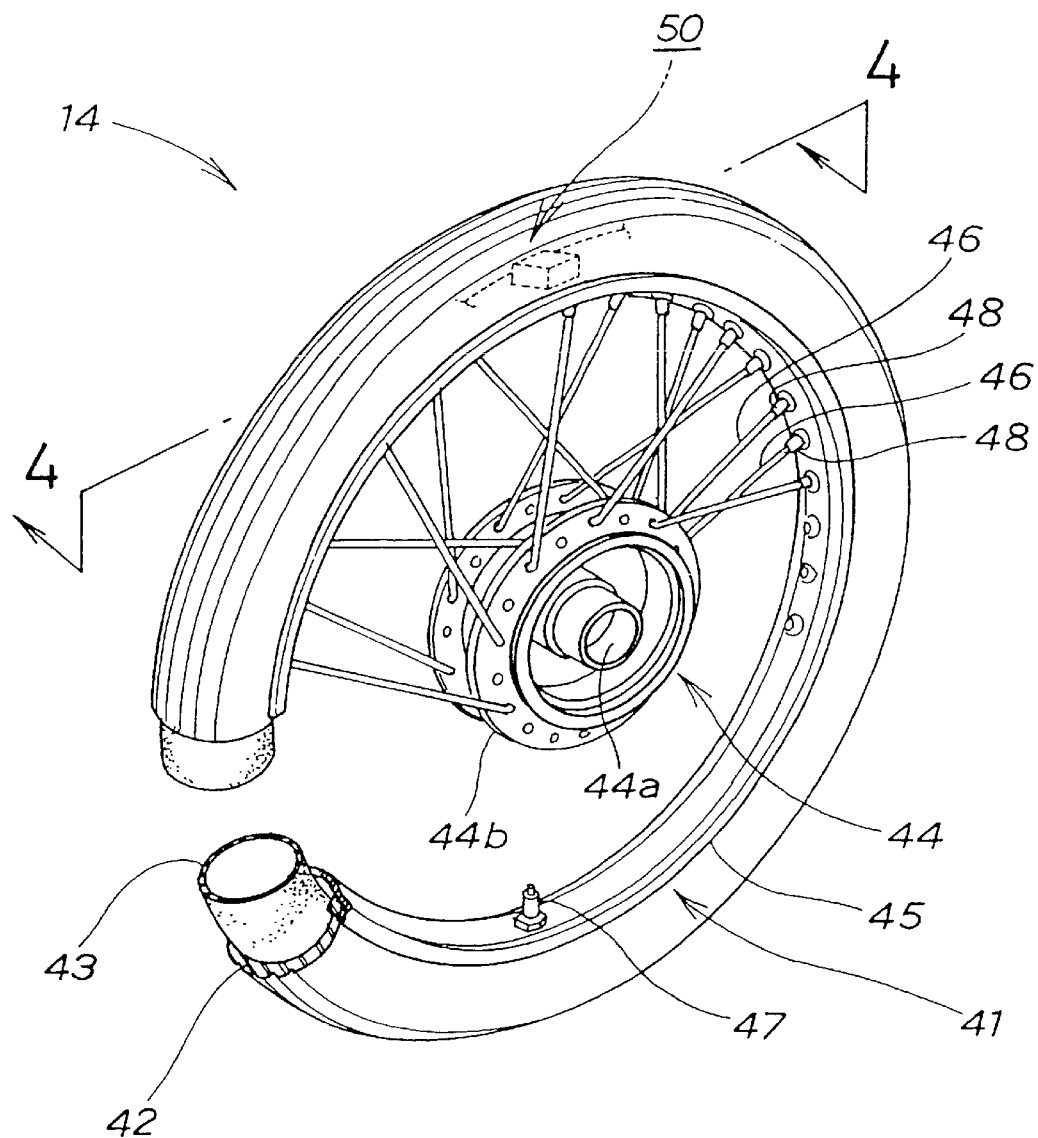
FIG. 3 is a perspective view of a wheel which incorporates the air pressure detecting device for a wheel according to the present invention.

FIG. 3 is a perspective view of the wheel which incorporates the air pressure detecting device for a wheel according to the present invention. The wheel portion 41 comprises a hub 44 rotatably mounted on the axle 24, a rim 45 on which the tire 42 is mounted, and a plurality of spokes 46 . . . ( . . . indicates a plurality) interconnecting the rim 45 and the hub 44.

The hub 44 comprises a bearing member 44a fitted over the axle 24 with a bearing (not shown) interposed therebetween. Disks 44b . . . are provided that engage the spokes 46. The rim 45 includes an air valve 47 for introducing air into the tire 42.

The spokes 46 include ends engaging the disks 44b of the hub 44 and distal ends attached to the rim 45 by nipples 48. Thus, the spokes 46 integrally coupling the rim 45 and the hub 44 to each other.

The rear wheel 18 shown in FIG. 1 is essentially identical to the front wheel 14, and will not be described in detail below.

Figure 4:
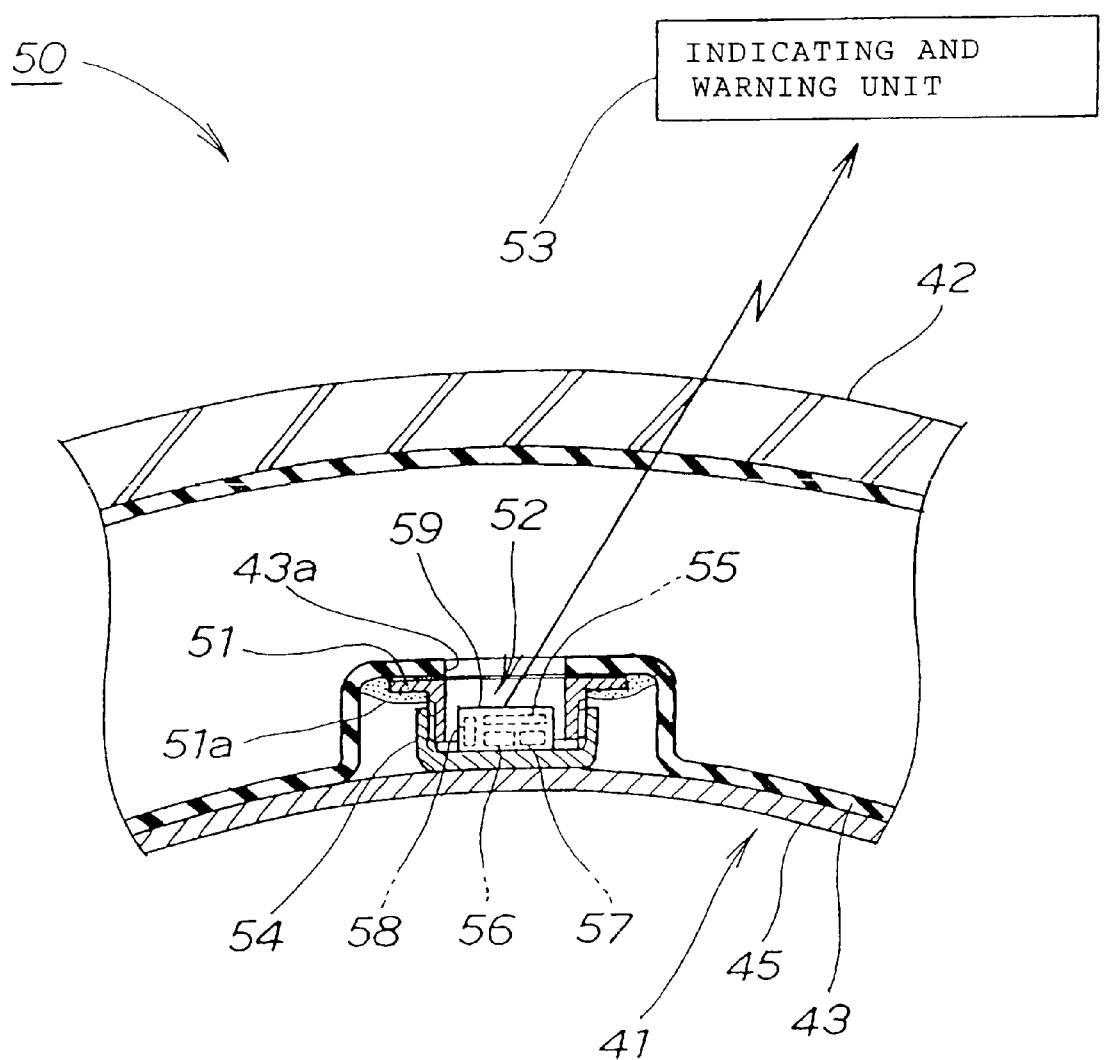
FIG. 4 is a cross-sectional view taken along line 4—4 of FIG. 3.

FIG. 4 is a cross-sectional view taken along line 4—4 of FIG. 3, showing a sectional front elevation of the air pressure detecting device 50.

The air pressure detecting device 50 comprises an annular seat 51 mounted in an opening 43a defined in a tire tube 43. A lid member 54 is removably fitted over the seat 51. A detecting and transmitting unit 52 is integrally mounted in the lid member 54 for detecting an air pressure in the tire tube 43 and transmitting pressure information out of the detecting and transmitting unit 52. An indicating and warning unit 53 are provided for receiving the pressure information from the detecting and transmitting unit 52 and indicating the pressure information or issuing a warning. The seat 51 is bonded to the tire tube 43 by an adhesive 51a. The indicating and warning unit 53 is a unit mounted on the instrumental panel 37 (see FIG. 2) as described later on.

The detecting and transmitting unit 52 comprises a pressure sensor 55 for detecting a tire pressure. A detecting circuit 56 is provided that is connected to the pressure sensor 55 for extracting the pressure information as an electric signal. A transmitting circuit 57 is provided for transmitting the electric signal from the detecting circuit 56 as a radio wave. A cell 58 energizes the detecting circuit 56 and the transmitting circuit 57. A case 59 provides a housing for the pressure sensor 55, the detecting circuit 56, the transmitting circuit 57 and the cell 58.

The air pressure detecting device 50 is used with the wheel of the vehicle which has a tire tube 43 disposed in the tire 42. The air pressure detecting device 50 is disposed between the tire tube 43 and the rim 45 of the wheel portion 41 for detecting the air pressure of the tire 42. The air pressure detecting device 50 includes an annular seat 51 mounted in the opening 43a that is defined in the tire tube 43. The lid member 54 is fitted over the seat 51. The detecting and transmitting unit 52 is integrally mounted in the lid member 54 for detecting an air pressure in the tire tube 43 and transmitting pressure information out of the detecting and transmitting unit 52.

The air pressure of the tire is detected based on driving information which can be known while the vehicle is being operated. The air pressure detecting device 50 has the detecting and transmitting unit 52 integrally mounted in the lid member 54 and the lid member 54 is removably fitted over the seat 51. When the tire is to be replaced, the lid member 54 is removed, and the detecting and transmitting unit 52 is attached to a new tire for use. The air pressure detecting device 50 has the seat 51 mounted in the opening 43a defined in the tire tube 43, the lid member 54 is removably fitted over the seat 51, and the detecting and transmitting unit 52 are integrally mounted in the lid member 54 for detecting an air pressure in the tire tube 43 and transmitting pressure information out of the detecting and transmitting unit 52 for the driver to know the tire pressure even while the vehicle is being operated.

The air pressure detecting device 50 has the detecting and transmitting unit 52 integrally mounted in the lid member 54 and the lid member 54 is removably fitted over the seat 51. When the tire is to be replaced, the lid member 54 is removed, and the detecting and transmitting unit 52 is attached to a new tire for use.

Thus, the detecting and transmitting unit 52 can be reinstalled for reuse. As a result, the air pressure detecting device 50 can effectively be used for material saving.

Figure 5:
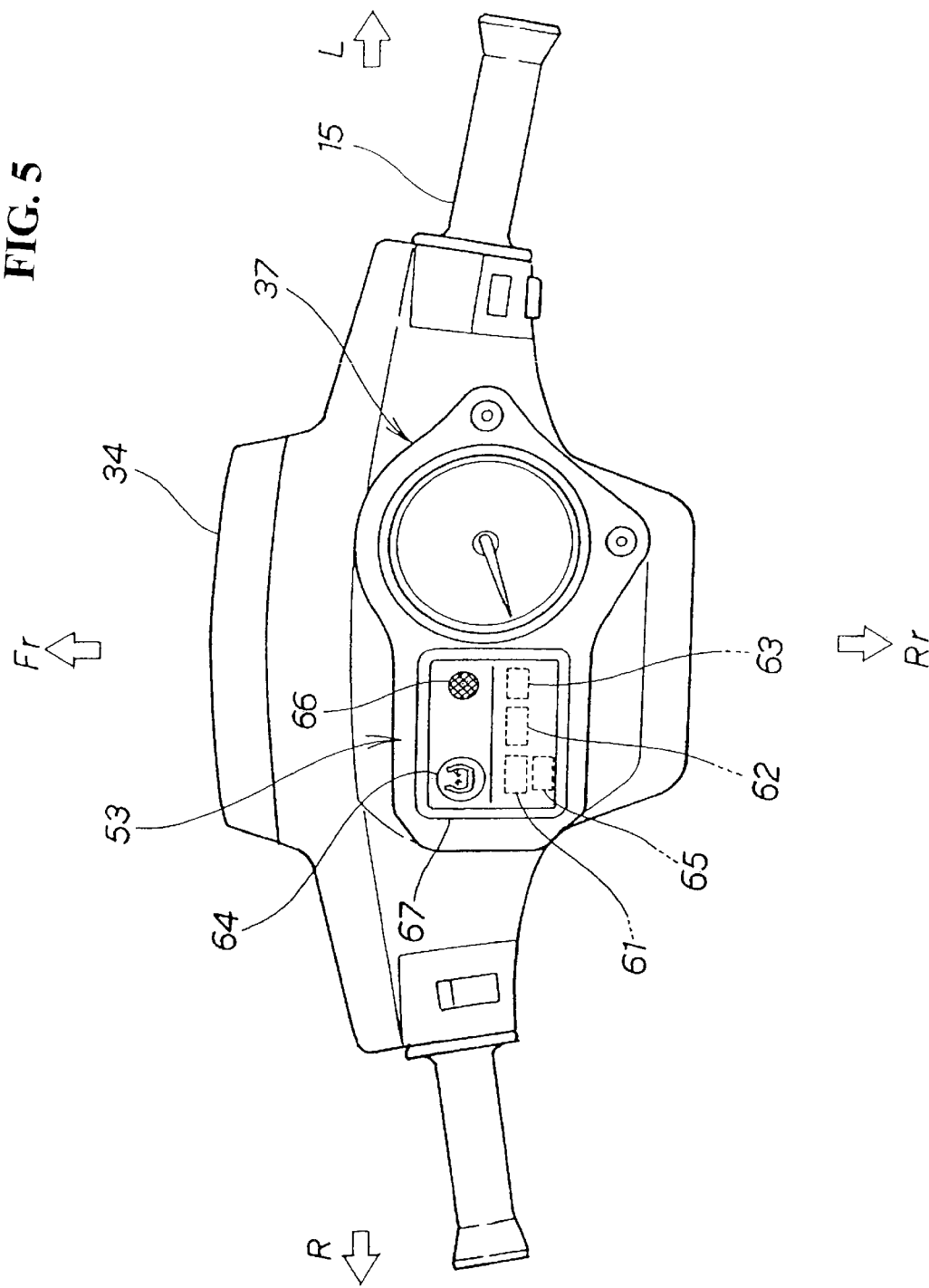
FIG. 5 is a plan view of an indicating and warning unit of the air pressure detecting device according to the present invention.

FIG. 5 is a plan view of the indicating and warning unit of the air pressure detecting device according to the present invention, showing the instrumental panel 37 mounted on the handle 15.

The indicating and warning unit 53 is mounted on the instrumental panel 37, and comprises a receiving circuit 61 for receiving a radio wave transmitted from the detecting and transmitting unit 52 shown in FIG. 3. A voltage amplifying circuit 62 is provided for amplifying a signal received by the receiving circuit 61. An indicating circuit 63 is provided for indicating a tire pressure based on a voltage value amplified by the voltage amplifying circuit 62. An indicating means 64 is energizable by the indicating circuit 63. A warning activating circuit 65 is operable when the voltage value, amplified by the voltage amplifying circuit 62, is lower than a predetermined voltage value. A warning means 66 is energizable by the warning activating circuit 65. A housing 67 is provided for housing the receiving circuit 61, the voltage amplifying circuit 62, indicating circuit 63, the indicating means 64, the warning activating circuit 65, and the warning means 66.

Operation of the air pressure detecting device 50 as described above will be described below.

Figure 6:
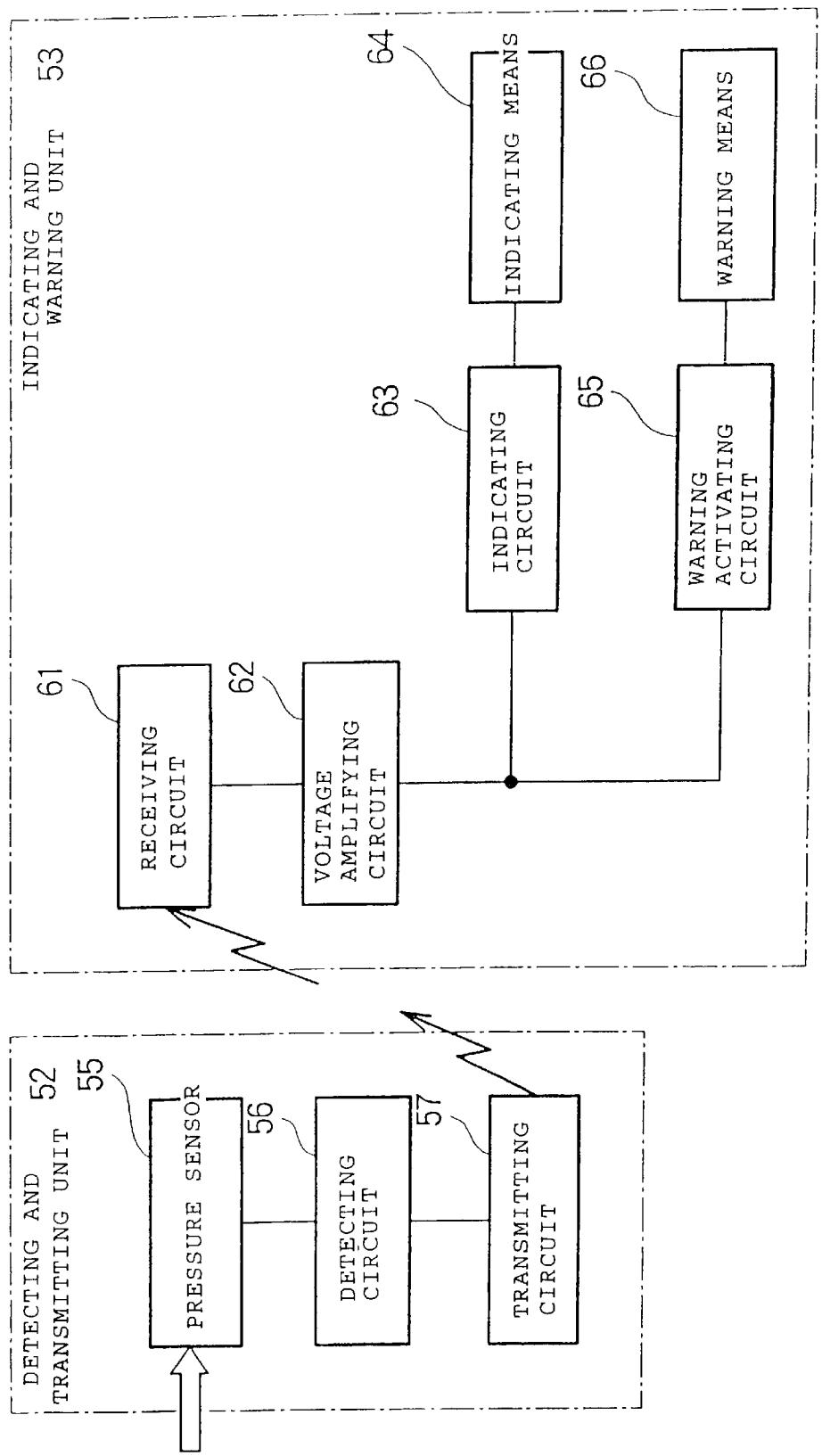
FIG. 6 is a block diagram of an air pressure detecting device for a wheel according to the present invention.

FIG. 6 is a block diagram of the air pressure detecting device for a wheel according to the present invention. The pressure sensor 55 detects a tire pressure, and the detecting circuit 56 extracts pressure information as an electric signal. The transmitting circuit 57 transmits the electric signal to the indicating and warning unit 53.

The radio wave transmitted from the detecting and transmitting unit 52 is received by the receiving circuit 61, and a signal received by the receiving circuit 61 is amplified by the voltage amplifying circuit 62. In order to indicate the tire pressure based on a voltage value amplified by the voltage amplifying circuit 62, the indicating circuit 63 converts the voltage value into a given signal, and the indicating means 64 indicates the tire pressure.

When the voltage value amplified by the voltage amplifying circuit 62 is lower than a predetermined voltage value, the warning activating circuit 65 is operated to cause the warning means 66 to indicate a lack of tire pressure.

Figure 7:
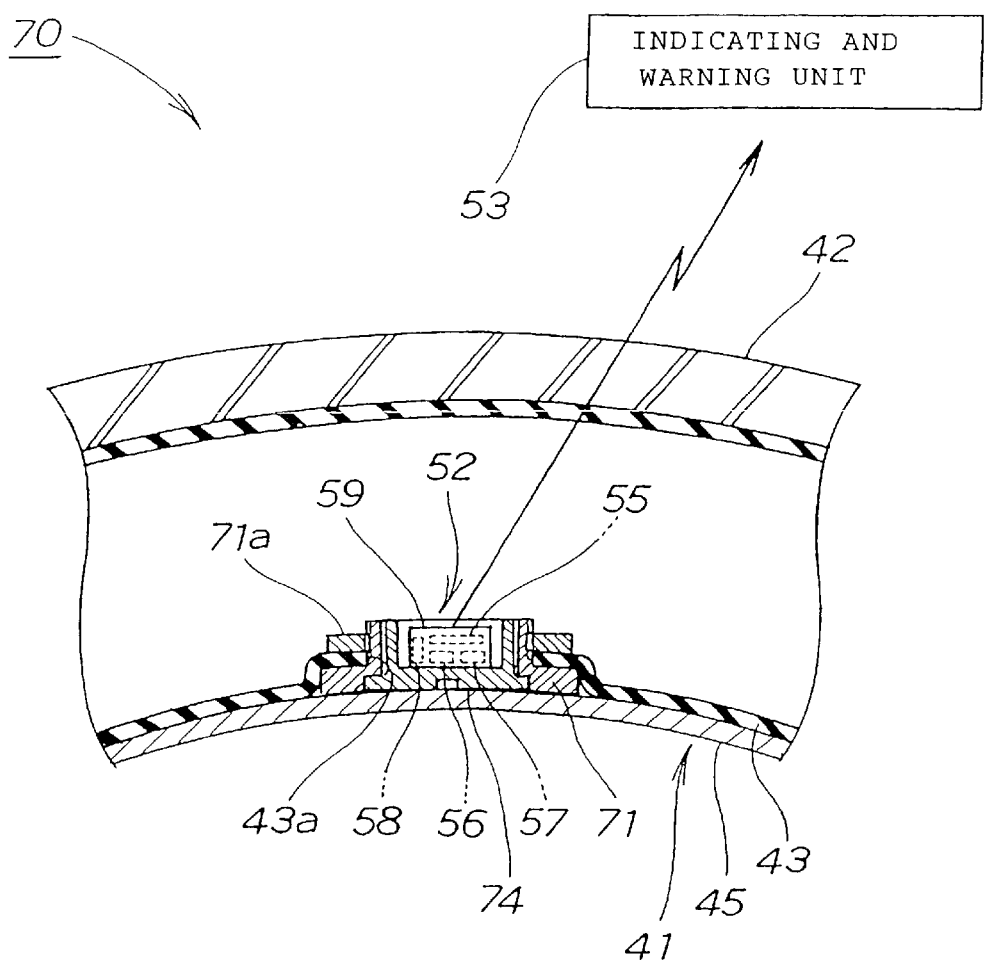
FIG. 7 is a side elevational view of an air pressure detecting device for a wheel according to a second embodiment of the present invention.

FIG. 7 is a side elevational view of an air pressure detecting device for a wheel according to a second embodiment of the present invention. The parts of the air pressure detecting device according to the second embodiment which are identical to the parts of the air pressure detecting device 50 (see FIG. 4) are denoted by identical reference characters, and will not be described in detail below.

An air pressure detecting device 70 comprises an annular seat 71 mounted in an opening 43a defined in a tire tube 43. A lid member 74 is removably fitted in the seat 71. A detecting and transmitting unit 52 is integrally mounted in the lid member 74. An indicating and warning unit 53 is provided for receiving the pressure information from the detecting and transmitting unit 52 and for indicating the pressure information or issuing a warning. The seat 71 is fastened to the tire tube 43 by a nut 71a.

Figure 8:
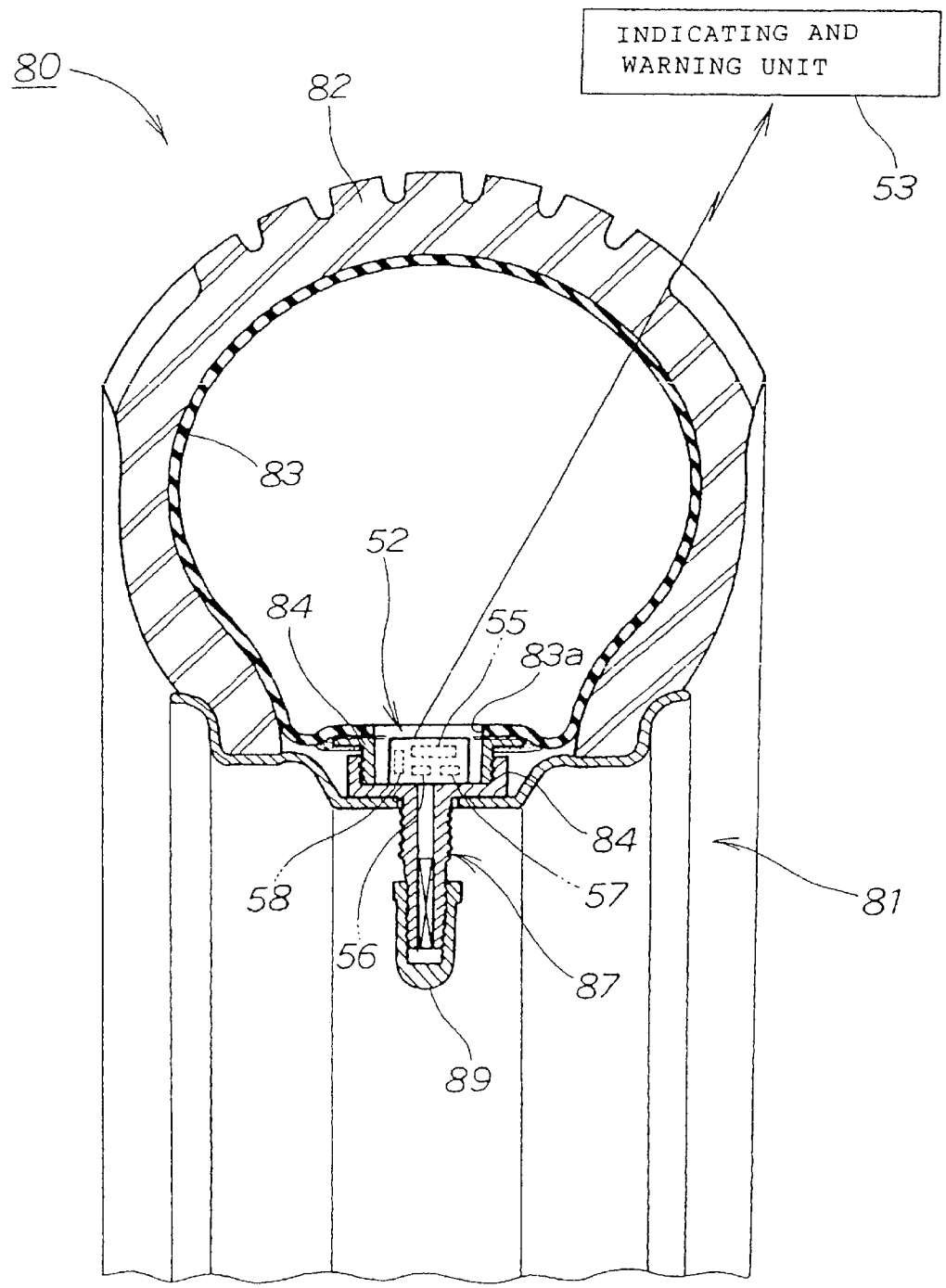
FIG. 8 is a side elevational view of an air pressure detecting device for a wheel according to a third embodiment of the present invention.

FIG. 8 is a side elevational view of an air pressure detecting device for a wheel according to a third embodiment of the present invention. The parts of the air pressure detecting device according to the third embodiment which are identical to the parts of the air pressure detecting device 50 (see FIG. 4) are denoted by identical reference characters, and will not be described in detail below.

An air pressure detecting device 80 comprises an annular seat 81 mounted in an opening 83a defined in a tire tube 83. A lid member 84 is removably fitted over the seat 81. An air valve 87 is integrally mounted on the lid member 84. A detecting and transmitting unit 52 is integrally mounted in the lid member 84 for detecting an air pressure in the tire tube 83 and transmitting pressure information out of the detecting and transmitting unit 52. An indicating and warning unit 53 are provided for receiving the pressure information from the detecting and transmitting unit 52 and indicating the pressure information or issuing a warning. A tire 81 includes a wheel 82 mounted on a rim with an air valve 87 disposed on the rim with a cap 89 removably mounted on the air valve 87.

Since the air pressure detecting device 80 has the air valve 87 integrally mounted on the lid member 84 for introducing air into the tire tube 83, the number of parts of the wheel are reduced. As a result, the costs of the wheel and the air pressure detecting device 80 are lowered.

In the above embodiments, the vehicle has been described as the motorcycle 10 as shown in FIG. 1. However, the vehicle is not limited to a two-wheel vehicle. The vehicle may be a four-wheel vehicle or a three-wheel vehicle.

In the above embodiment, the indicating means 64 and the warning means 66 are mounted on the instrumental panel 37 as shown in FIG. 4. However, they may be incorporated in the chassis frame or in a helmet if they issue a warning, or may be incorporated in the seat or a helmet if they apply vibrations. While the indicating and warning unit 53 has been described as a unit for the front wheel 14 (see FIG. 1), it may also be used as a unit for indicating a tire pressure or issuing a warning for the rear wheel 18 (see FIG. 1).

The present invention thus arranged offers the following effects:

According to the present invention, there is provided an air pressure detecting device for detecting the air pressure of a wheel of a vehicle which has a tire tube disposed in a tire. The air pressure detecting device is disposed between the tire tube and the rim of the wheel for detecting the air pressure of the tire. The air pressure detecting device comprising an annular seat mounted in an opening defined in the tire tube. A lid member is held in removably fitting engagement with the seat. A detecting and transmitting unit is integrally mounted in the lid member for detecting an air pressure in the tire tube and transmitting pressure information out of the detecting and transmitting unit. When the tire is to be replaced, the lid member is removed, and the detecting and transmitting unit is attached to a new tire for use. Thus, the detecting and transmitting unit can be reinstalled for reuse. As a result, the air pressure detecting device can effectively be used for a material saving.

According to the present invention, the air pressure detecting device has an air valve integrally mounted on the lid member for introducing air into the tire tube. Therefore, the number of parts of the wheel is reduced. As a result, the costs of the wheel and the air pressure detecting device are lowered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air pressure detecting device for detecting air pressure of a wheel of a vehicle which has a tire tube disposed in a tire, the air pressure detecting device being disposed between the tire tube and a rim of the wheel for detecting the air pressure of the tire tube comprising:

an annular seat fixed against said tire tube and mounted adjacent to an opening defined in said tire tube;

a lid member held in removably fitting engagement with the seat;

a detecting and transmitting unit integrally mounted in the lid member for detecting air pressure in said tire tube and transmitting pressure information out of the detecting and transmitting unit.

2. The air pressure detecting device according to claim 1, wherein an air valve is integrally mounted on said lid member for introducing air into said tire tube.

3. The air pressure detecting device according to claim 1, wherein the detecting and transmitting unit includes a pressure sensor for detecting the pressure of the tire tube.

4. The air pressure detecting device according to claim 3, and further including a detecting circuit operatively connected to the pressure sensor for converting pressure information into an electrical signal.

5. The air pressure detecting device according to claim 4, and further including a transmitting circuit for transmitting the electrical signal from the detecting circuit as a radio wave.

6. The air pressure detecting device according to claim 5, and further including a power source operatively connected for energizing said detecting and transmitting unit.

7. The air pressure detecting device according to claim 1, and further including a fastener for securing the tire tube to the seat.

8. The air pressure detecting device according to claim 1, and further including an air valve operatively connected to said lid member for supplying air to said tire tube.

9. An air pressure detecting device for detecting air pressure of a wheel of a vehicle during operation of the vehicle, the air pressure detecting device being disposed on a surface of a rim facing a tire and in a position between a tire tube and the rim for detecting the air pressure of the tire tube comprising:

an annular seat secured against an opening in said tire tube;

a lid member mounted on said seat; and a detecting and transmitting unit secured to the lid member so as to be positioned in the opening of the tire tube and facing an inside of the tire tube, the detecting and transmitting unit for detecting air pressure in said tire tube and transmitting pressure information out of the detecting and transmitting unit.

10. The air pressure detecting device according to claim 9, wherein an air valve is integrally mounted on said lid member for introducing air into said tire tube.

11. The air pressure detecting device according to claim 9, wherein the detecting and transmitting unit includes a pressure sensor for detecting the pressure of the tire tube.

12. The air pressure detecting device according to claim 11, and further including a detecting circuit operatively connected to the pressure sensor for converting pressure information into an electrical signal.

13. The air pressure detecting device according to claim 12, and further including a transmitting circuit for transmitting the electrical signal from the detecting circuit as a radio wave.

14. The air pressure detecting device according to claim 13, and further including a power source operatively connected for energizing said detecting and transmitting unit.

15. The air pressure detecting device according to claim 9, and further including a fastener for securing the tire tube to the seat.

16. The air pressure detecting device according to claim 9, and further including an air valve operatively connected to said lid member for supplying air to said tire tube.

* * * * *